Patented Apr. 3, 1951

2,547,127

UNITED STATES PATENT OFFICE 2,547,127

CALCIUM SILICATE OF MICROCRYSTALLINE LATHLIKE STRUCTURE

George L. Kalousek, Toledo, Ohio, assignor to Owens-Illinois Glass Company, a corporation of Ohio No Drawing. Application February 17, 1949, Serial No. 77,060

2 Claims. (Cl. 23—110)

This invention relates to the production of a new integrated hydrous silicate solid suitable for use as insulation in the field of high temperature, i. e., above 800° C., and which may also be used in the low temperature field both as insulation and as a structural unit such as roof tile.

The primary object of this present invention is the production of a new hydrous silicate product in which a pure microcrystalline structure is matured by reaction under heat and pressure.

A further object is the production of a product wherein the crystals of this generated structure are in random interlocked dispersion throughout the product, thus providing a high degree of strength not found in the usual hydrous silicate products.

Another object is the production of a new hydrous silicate having the properties of great resistance to high temperature as well as resistance to high thermal shock.

A still further object is to produce such a product with high resistance to $CO_2$ attack of air and resistance to corrosion by water.

Other objects will be apparent from the following descriptive matter.

The present invention provides an integrated material consisting basically of a reaction product of lime and silica in the form of a hydrous calcium silicate having the formula

$$5CaO.5SiO_2.H_2O$$

Structurally the material comprises such silicate in the form of microscopic lath-like crystals interspersed with microscopic voids, the material being of light weight, having a microscopically fine texture and visually being of apparent homogenity throughout the body of the material. It combines light weight and a texture giving it a high insulating value, with a modulus of rupture adapting the material for various insulating and structural purposes as more fully pointed out hereinafter.

It is well-known in the field of hydrous silicate products that reactants such as silica and water react under heat and/or pressure to form gels or gel-like microcrystalline structures, and that the extent to which they are converted to crystalline solids depends on their nature, the temperature employed, the time of induration and the composition of the mixture from which they are to be produced. These gels are formed at temperatures and during periods of induration used, for example, in the manufacture of sand-lime brick and low density hydrous calcium silicate products. Also, they have been found present along with calcium silicate hydrates in products produced at temperatures in excess of those used in manufacturing processes in the siliceous field. A most typical example is the coexistence of these "gels" and a definite lath-like crystal structure in reaction mixtures where incomplete crystallization has occurred particularly in a lime-silica slurry in which the lime content is greater than that commonly employed, and which has been indurated at certain controlled and regulated low temperatures. However, by indurating at pressures in excess of 125 pounds per square inch (125 p. s. i.) and 173° C. these "gel" phases may be completely avoided, and they may also be avoided by indurating for long periods at low pressures.

The essence of this present invention is the preparation of a synthetic, integrated hydrous silicate product having a microcrystalline lath-like structural formation, interspersed with voids, which may be prepared in integrated form through a range of apparent densities at temperatures considerably lower and in time periods much shorter, than have heretofore been considered feasible.

By control of variables, such as temperatures, pressures, time of induration, degree of dispersion of the solids in liquid carriers, the degree of fineness of the solids, any and all deleterious gels or gel-like phases may be substantially eliminated and pure lath-like microcrystalline crystals varying in length from the submicroscopic to lengths easily discernible under a microscope will be the final resultant.

This microcrystalline lath structure is superior to other hydrous silicate type structures in properties such as heat insulation, modulus of rupture, shrinkage during drying and stability at elevated temperatures. This new product is superior to previously manufactured hydrous silicate products with respect to its resistance to $CO_2$ attack of air and resistance to corrosion by water.

It can be synthesized from high calcium quicklime, or high calcium hydrated lime, and ground quartz or various other forms of silica without the addition of any bonding material such as asbestos, blast furnace slag, Portland cement, plaster of Paris, bentonite, etc., commonly used in hydrous silicate products for providing strength and thus may be produced at comparatively low cost.

The resultant product to be produced through this invention is a true crystalline solid that will possess the advantages of such; namely, freedom from shrinkage and cracking and wherein no reinforcement, such as asbestos fiber, need be utilized for increasing strength or preventing cracking in the finished product.

This crystalline solid is to be produced through an extremely wide range of apparent densities having practical application and usefulness from the lightest through the range of heavier apparent densities to the extent necessary in any practical commercial application.

Experience has shown that in the production of this pure crystalline solid, two methods must be practiced in order to cover the full range of apparent densities, i. e., from the extreme lower density up to approximately 15 pounds per cubic foot (15# p. c. f.). Throughout this range of lower densities relatively great quantities of water are required, and it is necessary to utilize an agent of retardation to prevent settling of the solids in the slurry formulation and to maintain proper dispersion thereof in the aqueous medium. In the density range upwards from approximately 15# p. c. f., the component solid materials of the slurry will maintain their own proper dispersion in the aqueous medium for a period of time sufficient to permit initial reaction to occur to freeze or arrest any possible separation or segregation of the components.

In the light apparent density range, it may be found necessary to add to the mixture of lime, silica and water an amount of highly spiculated asbestos, or other retarding agent, sufficient to support the granular components in a fine dispersion for a period of time sufficient to permit initiation of a gel phase which will thereafter retain the solids in their proper dispersion.

It is intended that almost any agent that will increase the viscosity of the slurry in relatively short time to prevent segregation of the solids may be used as the retarding agent providing it does not have a deleterious effect upon the ultimate desired product. Other retarding agents such as highly pulped and beaten paper, starch or similar agents may be utilized as the retardant in the aqueous formulation.

When the finely divided solid components of the slurry formulation, namely, lime and silica are dispersed through a very large volume of water with the components (or solution) retained in a wide state of dispersion through the use of a retarding agent and the reaction carried to hydrated calcium silicate, the lath crystals of hydrous calcium silicate will be induced to grow and present a randomly dispersed mass of lath crystals throughout the entire volume in which the reactive agents have been held in dispersion prior to and during at least a portion of the reaction period.

Moreover, in the course of their crystal growth the forming lath crystals of the various clusters thereof will to a considerable degree cross at varying points of contact with each other to thus interlace and interlock into a permanent three-dimensional network of microcrystalline lath structure in random dispersion.

The dissipation of the excess water from the indurated mass will always leave a volume of voids greater than the volume of the lath crystals.

In the heavier density materials, i. e., those in the range where an agent for retarding the settling of the solids is unnecessary, the component lime will perform the function of maintaining the solids in proper dispersion and will prevent any harmful segregation thereof.

To make the desired light density product, the slurry should be prepared in a $CaO/SiO_2$ molar ratio of approximately 1.0 by mixing first the lime and hot water and then adding quartz. Depending upon the apparent density required, an amount of retarding agent such as asbestos or starch will be added sufficient to prevent segregation of the solids for a predetermined time interval prior to initiation of reaction.

The slurry will be poured into pans or molds having a desired predetermined shape, the molds placed in an indurator where pressure and heat will be applied to bring about, under reaction, the formation of the microcrystalline lath structure and the complete integration and drying of the product. The drying of the product may be accomplished in the indurator or in the usual drying oven.

In the heavier densities the same process is employed excepting only that no retarding agent need be utilized. Regardless of the density desired in the ultimate product, the mole ratio of lime to silica, in the slurries, should be approximately 1.0.

The temperature, pressure, and time utilized at induration will determine the extent to which the inherent gels are eliminated and the percentage of pure microcrystalline solid obtained. For example, the temperature and pressures usually utilized in the lime-silica systems will, in a period of about 15 hours, provide incomplete crystallization of the components of this present slurry but even though the reaction may be incomplete with some gel phase remaining, yet a great portion of the solid structure will reach the stage of a microcrystalline lath structure interspersed with voids and having appreciable strength as well as many other desirable physical properties.

The reacted product so obtained contains too high a percentage of gel or gel-like microcrystalline solids which results in a product that cracks upon drying.

By indurating these lime-silica slurries at pressures and temperatures well beyond the usual conditions, particularly slurries of equimolar ratio of the lime and silica, practically all gel formation is eliminated within a very few hours, and upon drying, the aqueous medium is dissipated, leaving in its place a volume of voids of microscopic dimension or less and with said voids being in excess of the volume of the resultant pure crystalline lath structure.

The nature of the slurries to be used will be determined by the desired apparent density of the indurated product. For the lower densities, in the range of about 5 to 15 p. c. f., a suspension aid such as any of the aforementioned agents will be introduced into a mixture of freshly hydrated lime and silica in which the molar ratio of the CaO to that of the $SiO_2$ is approximately 1.0. The quicklime is hydrated completely and rapidly by adding it to hot water (150–175° F.) and stirring continuously and vigorously the resulting mixture for 1 or 2 minutes. The amount of water, in parts per part of dry solids, will range from about 10 for the 5 p. c. f. apparent density product to about 4.5 for the 15 p. c. f. apparent density product. The amount of retardant utilized will vary according to its physical characteristics from about 10 percent by weight of the solids for the lightest apparent density to about 1 percent for the 15 p. c. f. apparent density.

In the range from about 15 to 25 p. c. f. apparent density the molar ratio of lime to silica will be 1.0:1.0 and (water in parts per part of dry solids from about 4.5 to 1.5). The freshly hydrated lime alone will suffice to prevent differential segregation of the solids. In the range from about 25 to 45 p. c. f. apparent density (the ratio of water to solids will range from about 1.5 to .75 parts water for each part of dry solids). In this range; an equivalent amount of dry powdered $Ca(OH)_2$ instead of quicklime will be used, and for products in excess of 45 p. c. f., the raw mix will be a plastic paste. Such pastes will be handled or formed in a manner similar to that for handling clay mixes for brick or tile, that is, they may be hand placed, poured into molds or extruded.

As an indication of the strength obtainable in this new product, without asbestos, as well as the short indurating periods required, there is listed here below a table showing the results obtained with two samples in three periods of induration at a temperature and pressure of approximately 208° C., and 250# respectively.

*Table 1*

| Hours of Induration | 4 | 7 | 12 |
|---|---|---|---|
| Modulus of rupture, p. s. i. (Sample 1) | 212 | 251 | 232 |
| Modulus of rupture, p. s. i. (Sample 2) | 249 | 277 | 211 |
| Density, p. c. f. (Sample 1) | 20.7 | 21.4 | 19.9 |
| Density, p. c. f. (Sample 2) | 21.4 | 19.6 | 20.0 |
| Free $SiO_2$, per cent average | 2.2 | ¹ 1.8 | .9 |
| Ign. Loss, per cent average | 6.5 | ¹ 4.9 | 5.6 |

¹ Average of two results.

From Table #1, it is apparent that the average modulus is 238# p. s. i. which is above that found in the usual hydrous silicate products.

In addition to the above factors, it is found that in the field of compressive strengths this new product is again superior in its field, as 20# density will have a compressive strength of 500# p. s. i., 30# density, 900# p. s. i., and 45.5# density, 2350# p. s. i.

The lath-like microcrystalline structure obtained through this invention is of great value as insulation in the high temperature field and tests to determine its applicability indicate it will withstand excessively high temperatures for long periods of time without breaking or disintegrating.

For example, this material at 20# density, was subjected to a series of tests wherein the surface temperature, from direct flame application, reached approximately 2000° F. and after two hours of exposure thereto was subjected to a stream of cold water under pressure without shattering and with only superficial surface cracking.

The shrinkage of this material is extremely low when compared to other lime-silica products and its hardness of 6.5 according to Mohs scale, together with its quality of withstanding extreme thermal shock upon quenching makes it a most desirable product for many purposes and in particular for fire resistant structures. Such a product, because of its rigid structure lends itself to various forms or methods of finishing, such as; shaping, cutting and sawing as well as the polishing of its surfaces to very smooth finish.

From the preceding, it should be apparent that this new product, namely, this pure microcrystalline lath structure has physical properties superior to previously known hydrous silica products.

In order to render a complete understanding of the product, its formation and characteristics and in particular the invention herein contemplated, the following description is set forth.

The formation of this pure microcrystalline lath structure is actually a transition of the component materials, lime quarts and water, from the solid or solution, first to a true gel formation, thence to an extremely fine crystalline structure but still retaining the properties of a gel, then to a combination of this last mentioned gel and crystals of lath-like structure in formed clusters, to a conversion of the whole to a pure microcrystalline lath structure in formed clusters in random dispersion through the mass with approximately complete elimination of any gel formation, with the complete dissipation upon drying of all uncombined water and the formation thereby of voids in aggregate volume in excess of the aggregate volume of the lath-like crystals, the lath crystals being of parallel extinction, positive elongation, having indices of refraction: Alpha=1.583±0.003; gamma=1.594±0.003, the lime, silica and water being present in the crystals in the molar proportions of 5, 5, 1, respectively; this transition for practical and commercial purposes being effected through the application of pressures and temperatures which will vary with the degree of comminution of the solid materials employed and the time in which it is desired to complete the transition to an integrated and dried product.

The term "unity" as used herein shall be interpreted as meaning a mole ratio of 1:1 in the crystals of the finished product.

Modifications may be resorted to within the spirit and scope of my invention.

I claim:

1. A shaped product comprising a porous body structure consisting essentially of pure, synthesized crystals having the formula $$5CaO.5SiO_2.H_2O$$

and being continuously integrated with each other without any other bonding medium, and forming a three-dimensional network interspersed with voids, the aggregate volume of the voids being in excess of that of the crystals.

2. The method of forming an integrated product which comprises forming an intimate reactive mixture consisting essentially of lime, silica, and water, the amount of water in the mixture being within the range of about 4.5 to .75 times the aggregate weight of the solids, the molar ratio of the reactive CaO and $SiO_2$ being approximately 1:1, shaping the mixture, subjecting the shaped mixture to a predetermined indurating temperature and pressure in excess of 173° C. and 125 p. s. i., respectively, and thereby causing a reaction by which the lime, silica and water are converted completely to an integrated porous structure of pure microcrystalline lath crystals, having the formula $5CaO.5SiO_2.H_2O$, said crystals being in random dispersion and being integrated with each other and thereby maintaining said structure in integrated form independently of any other bonding medium, and drying the product to remove free water and leave a product in which the crystals have the formula $5CaO.5SiO_2.H_2O$.

GEORGE L. KALOUSEK.

REFERENCES CITED

The following references are of record in the file of this patent:

UNITED STATES PATENTS

| Number | Name | Date |
|---|---|---|
| 2,215,891 | Thompson | Sept. 24, 1940 |
| 2,421,721 | Smith | June 3, 1947 |
| 2,469,379 | Fraser | May 10, 1949 |

FOREIGN PATENTS

| Number | Country | Date |
|---|---|---|
| 2,128 | Great Britain | of 1909 |
| 501,024 | Great Britain | Feb. 20, 1939 |

OTHER REFERENCES

Dana: Textbook of Mineralogy, 4th ed., revised, New York, New York, John Wiley and Sons, 1932, page 641.